United States Patent
McFarlane et al.

(10) Patent No.: US 9,116,718 B2
(45) Date of Patent: Aug. 25, 2015

(54) DERIVE SIZE CONTRIBUTION OF FEATURES

(75) Inventors: Roger Delano Paul McFarlane, Saint Laurent (CA); Christopher Howard Hamilton, Montreal (CA); Eric Dingle, Montreal (CA); Sigurður Eggert Ásgeirsson, Beaconsfield (CA)

(73) Assignee: Google Inc., Mountain View, CA (US)

( * ) Notice: Subject to any disclaimer, the term of this patent is extended or adjusted under 35 U.S.C. 154(b) by 386 days.

(21) Appl. No.: 13/598,675

(22) Filed: Aug. 30, 2012

(65) Prior Publication Data
US 2015/0212802 A1    Jul. 30, 2015

(51) Int. Cl.
*G06F 9/44* (2006.01)
*G06F 9/45* (2006.01)
*G06F 11/34* (2006.01)

(52) U.S. Cl.
CPC ............ *G06F 8/443* (2013.01); *G06F 11/3466* (2013.01)

(58) Field of Classification Search
None
See application file for complete search history.

(56) References Cited

U.S. PATENT DOCUMENTS

| | | | |
|---|---|---|---|
| 5,950,009 A * | 9/1999 | Bortnikov et al. | 717/158 |
| 8,819,642 B2 * | 8/2014 | Bhat et al. | 717/130 |
| 2004/0117760 A1 * | 6/2004 | McFarling | 717/101 |

* cited by examiner

*Primary Examiner* — Don Wong
*Assistant Examiner* — Deric Ortiz
(74) *Attorney, Agent, or Firm* — McDermott Will & Emery LLP

(57) ABSTRACT

A development tool for optimizing a software program is disclosed herein. The tool may be implemented as machine readable instructions, part of a specially configured computer, or part of a practical application of a specialized process. The tool may comprise: an automation rig for executing the program, a capture tool having a plurality of data recorders, an aggregator for generating cluster data based on code block execution patterns, and a code writer for generating optimized binary programs.

27 Claims, 4 Drawing Sheets

DERIVE SIZE CONTRIBUTION OF FEATURES

BACKGROUND

Software programs may be designed to be compatible with a wide variety of data and users. Web browsers, for example, process millions of different websites, using many different scripts and applets. In the competitive field of software development, an application's loading speed, execution speed, and memory consumption may be important to customers. Optimizing the binary layout of the software to suit the typical usage of the software can improve its loading time and execution speed, while reducing its memory consumption. However, testing of the software across the large number of test cases can be time consuming. Also, determining which code blocks to reorganize and how they affect program performance for a large program can be difficult to determine.

SUMMARY

According to one embodiment, a development tool stored on tangible computer readable storage media is provided. The development tool may be configured to cause a processor of a computer to execute instructions. The instructions may include a capture tool, an aggregator, and a code writer. The capture tool may be configured to record which program blocks of an instrumented program are invoked when a use case is executed. The capture tool may generate trace data based on the invoked program blocks. The aggregator may be configured to analyze the trace data, determine a first of program blocks to cluster into a first binary, and determine a second set of program blocks to cluster into a second binary. The code writer may be configured to access the first and second set of program blocks. The code writer is configured to write code composing the first and second binary.

BRIEF DESCRIPTION

DETAILED DESCRIPTION

One or more embodiments described herein may allow a programmer to fully instrument a binary data file and profile it over feature uses to discover which code and data are exercised when using each feature.

One or more embodiments may provide a computer configured to group code and data of an application by features in close proximity with one another within the binary executable file. For example, the features may be in close proximity with respect to time of execution, location within the binary data file, exclusivity of invocation for a set of use cases, and frequency of execution (for example, things that are not otherwise related but are only executed rarely may be grouped together; likewise, library code that is not otherwise related but are commonly executed in many different contexts may be grouped together).

Figure 1A:
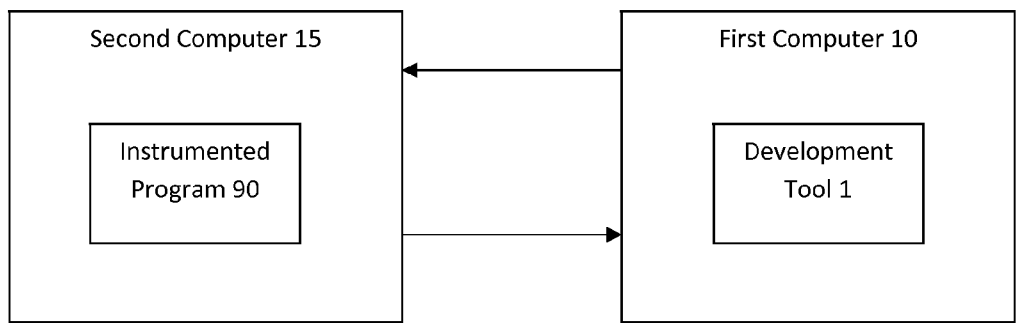
FIG. 1A shows a communication pathway between a first and second computer.
Figure 1B:
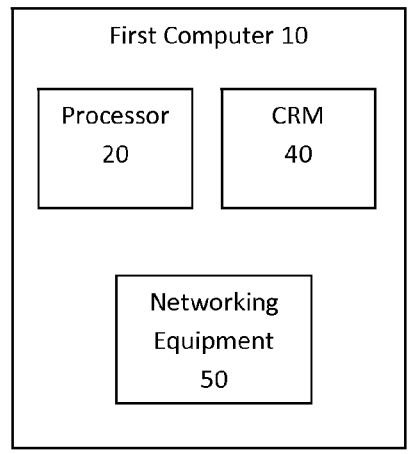
FIG. 1B shows some of components of a computer.

As shown in FIG. 1, a development tool 1 for optimizing a software program 90 is shown. Examples of software the development tool 1 may be used with may include any type of software compiled to machine code, including, but not limited to: web browsers, web servers, video games, and other applications. The tool may be implemented as machine readable instructions, part of a specially configured computer, or part of a practical application of a specialized process in a computer. As shown in FIG. 1, the computer 10 may comprise components such as a processor 20, tangible computer readable storage media for storing the tool 40, and networking equipment 50 for communicating with other computers. For example, there may be a first computer 10 configured to implement the development tool 1 and a second computer 15 configured to run the program 90. Moreover, multiple computers having multiple processors may be involved.

Figure 2:
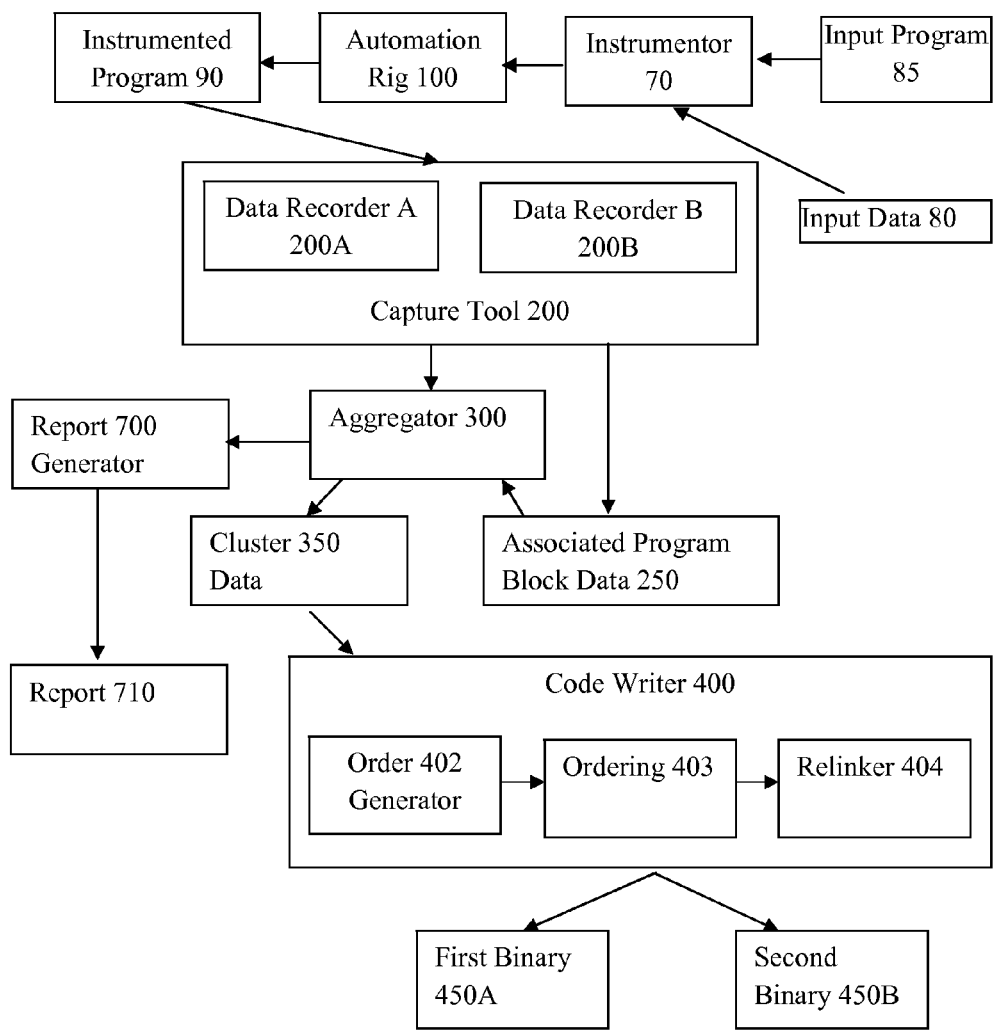
FIG. 2 shows a process flow diagram of an illustrative configuration.

As shown in FIG. 2, the tool may comprise an instumentor 70 for transforming an input program 85 and input data 80 into an instrumented program 90. The instrumented program 90 is the functional equivalent of the input program (i.e. the program being evaluated and optimized) except that the instrumented program 90 has been constructed or modified such that its execution can be monitored by a capture tool 200. An automation rig 100 may be configured to execute the instrumented program 90 using input data 80 such as a use case. The automation rig 100 may be a computer comprising a processor and computer readable media for causing the processor to run the instrumented program using the input data 80. The input data 80 may include uses cases, program input, data files, and other input values that the automation rig will deliver to the instrumented program as it executes functionality of the instrumented program.

The development tool may also comprise a capture tool 200 having a plurality of data recorders 200A and 200B, an aggregator 300 for generating cluster data 350 based on code block execution patterns and/or data block access patterns, and a code writer 400 for generating one more optimized binaries (450A & 450B). The capture tool may be configured to record which code block of the instrumented binary is invoked when a use case is executed. The capture tool 200 may be a program which uses the data recorders to capture execution trace information from the instrumented program as it carries out the use cases. The capture tool may associate each captured datum with the use case that was active at the time of its capture.

The capture tool 200 may generate trace data based on the invoked code blocks. Trace data may include data indicating how many times a particular code block or data block was executed during implementation of a use case. The aggregator 300 may be configured to analyze the trace data; determine a first set of code blocks to cluster into a first binary; and determine a second set of code blocks to cluster into a second binary.

The code writer 400 may comprise an order generator 402 and a relinker 404. The order generator 402 being configured to use cluster data to select a suitable layout to arrange data blocks to optimize the input program under various metrics (such as page fault patterns, working set size, etc.) The order generator 402 may generate an ordering 403, i.e., a description of the way the program should be written in one or more optimized binaries. The relinker 404 may be a program configured to rewrite the input program 85 such that its data blocks are arranged as per the ordering 403. In such a configuration, the relinker 404 may be provided the input program 85 and the ordering 403 as inputs, and one or more optimized binaries would be the outputs.

The data recorders may provide monitoring of execution of one or more code blocks of the instrumented program. They may also generate associated code block data 250 (i.e. blocks of code in the program), associated data block data (i.e. blocks of data values in a program), or both (associated program block data). Each data recorder may be configured so that it records or monitors for the execution of specific code blocks. Alternatively, a single monitor with multiple monitoring functions could be used so that a single monitor may monitor for execution of multiple code blocks.

The aggregator 300 may generate cluster data 350 based on observed code block execution patterns. Cluster data may comprise instructions on how to arrange the code blocks so that the writer can more efficiently write the optimized program. The code writer 400 may utilize the associated program block data 250 and cluster data 350 to prepare the optimized version 450 of the input program.

FIG. 2 also illustrates a report generator 700 and report 710. The report 710 may include a listing of functions or code blocks executed during a test case. The report may include an amount of memory the automation rig used (or other computer running the input program) to run the function or code block. Additional features such as: the number of clock cycles required to execute the function or code may be included, time stamps, or identifiers of other functions or code blocks commonly executed with the function or code block may be included.

In some configurations, the development tool generates two or more binaries. These binaries may be separate from one another, that is they are distinct, individual executable or dynamic linked libraries that may be capable of being executed by a processor separately from one another. These binaries may also be separate from the tool itself, the input program, and the instrumented program.

The development tool may be configured to generate binaries such that the program blocks (code blocks or data blocks) within the first binary are program blocks that were invoked during the execution of the use case. Similarly, the second binary may include program blocks which were not implemented during the execution of the use case. In some configurations, the program block will be executed or invoked only under certain conditions for a broad use case (invocation may require specific input data for example). Similarly, the development tool may designed such that it will generate a first binary including program blocks which are invoked for all or nearly all input values in a particular use case, a second binary including program blocks which are sometimes (~10-30%) or rarely (~5-10%) invoked for a particular use case, and a third binary including program blocks which never (or almost never (less 5% but greater than 0%)) invoked for a particular use case.

Figure 3:
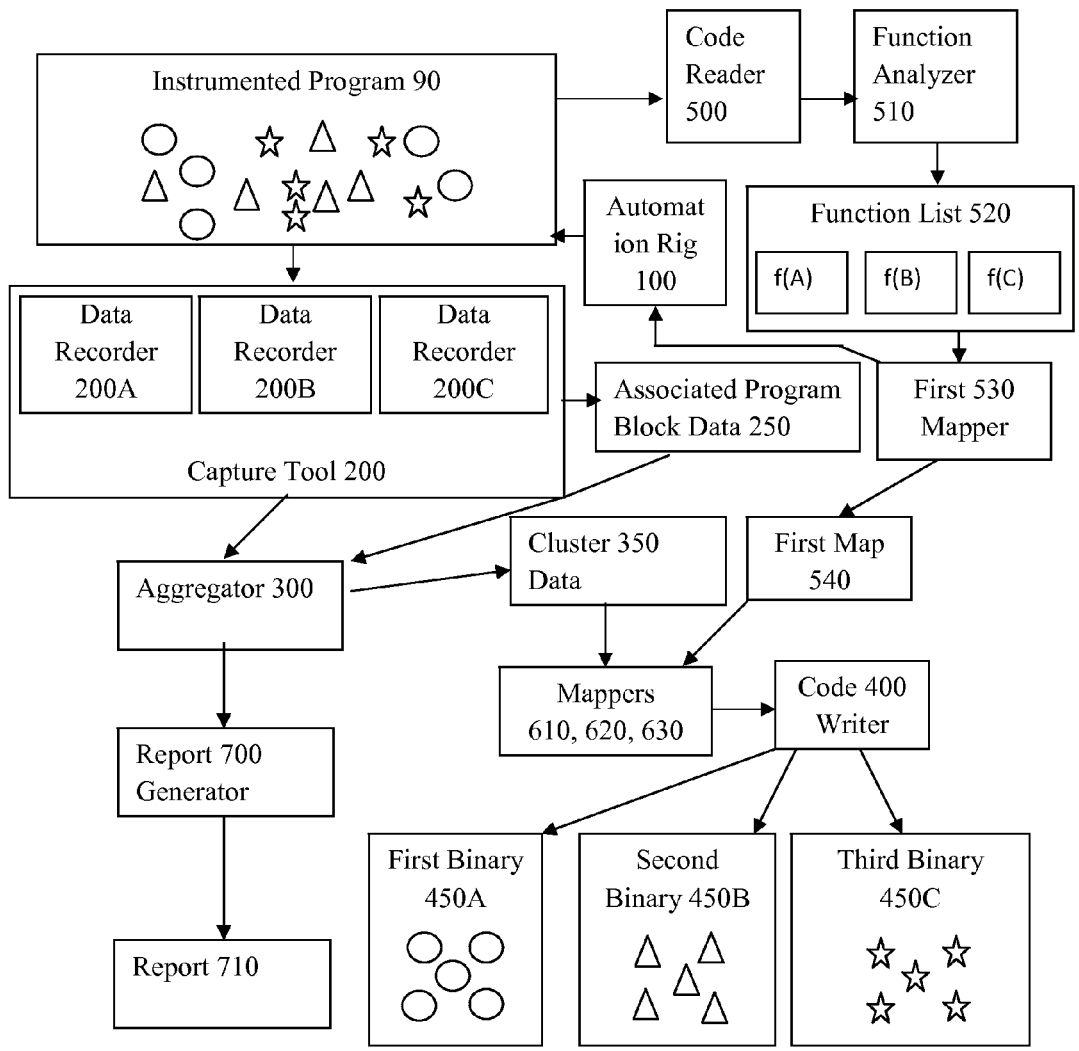
FIG. 3 shows a second process flow diagram of an illustrative configuration.

In addition to the components mentioned for FIG. 2, the development tool 1 may also comprise the features shown in FIG. 3, which comprise, inter alia, a function analyzer 510 and a first mapper 530. The function analyzer 510 may be configured to obtain code from the code reader 500 to generate a list of functions 520 the input program can perform. The code may be in the form of source code for example. The first mapper 530 may use this function list to generate a first map 540. The first mapper 530 or the development tool 1 may also invoke the automation rig to execute one or more of these functions. The automation rig 100 may run the particular function selected by the first mapper 530. The data recorders (200A, 200B, and 200C) of the capture tool 200 may then determine what program blocks are invoked when the function is executed. Each data recorder may monitor for a different pattern or function. For example, data recorder 200A may monitor frequency of execution of code blocks, while data recorder 200B monitors frequency of joint execution of code blocks, while data recorder 200C monitors frequency of code blocks being executed within a short time period of each other. Other monitoring functions may be used such as traversal of a particular program arc. The output of the data recorders, monitoring data or execution trace data, may include a capturing of stream of execution events, wherein the stream may be tagged with use case information.

Once collected, the monitoring data may be delivered to or accessed by the aggregator 300. The aggregator may use this code block information to generate cluster data 350, which can be accessed by one or more mappers (610, 620, and 630). The cluster data 350, output from the aggregator, may include associations between program blocks (code blocks or data blocks) and use cases. For example: program blocks which are active across many use cases may be clustered as common, while blocks mainly active during use case X may be clustered as X.

The mappers may create additional maps which are ultimately used by the code writer 400 to generate an optimized version of the input program 90. A map may provide the code writer with data on how to more efficiently generate an optimized program. The code writer 400 may be configured to optimize the program by placing startup instructions and frequently executed code blocks in a first part of the program, while placing termination instructions and less frequently executed code blocks in a second part of the program. The code writer may comprise a threshold function used to determine what is considered frequently executed and what is not. The threshold function may use a predetermined value, or a value determined at run time. In some configurations, the first component of the resulting program may be loaded into memory first and executed first when the program is executed by the processor.

As shown in FIG. 3, the output of the development tool may comprise three binaries, (binary 450A, binary 450B, and binary 450C). Binaries 450A, binary 450B, and binary 450C may be associated with the code block data collected by data recorders 200A, 200B, 200C. In generating the associated program block data, the data recorders of the capture tool may log each execution (and time thereof) of the associated program block.

This associated program block data (which may be associated program code block data or associated program data block data) may be accessed by the aggregator 300, which may be configured to cluster or group the code blocks into groups, each cluster group comprising several program blocks. The aggregator 300 may be configured to determine in which cluster to place each program block by analyzing the associated program block data. The aggregator 300 may also form clusters of two or more program blocks if the aggregator determines that the two or more program blocks should be grouped together. Reasons for clustering the program blocks together may include the aggregator determining the code blocks: are executed in a similar frequency, are frequently run together, are executed within a close time proximity of each other, and as for data blocks they may be accessed together frequently, comprise related data values, or used by similar code blocks. The aggregator may then store the clusters as cluster data 350.

Figure 4:
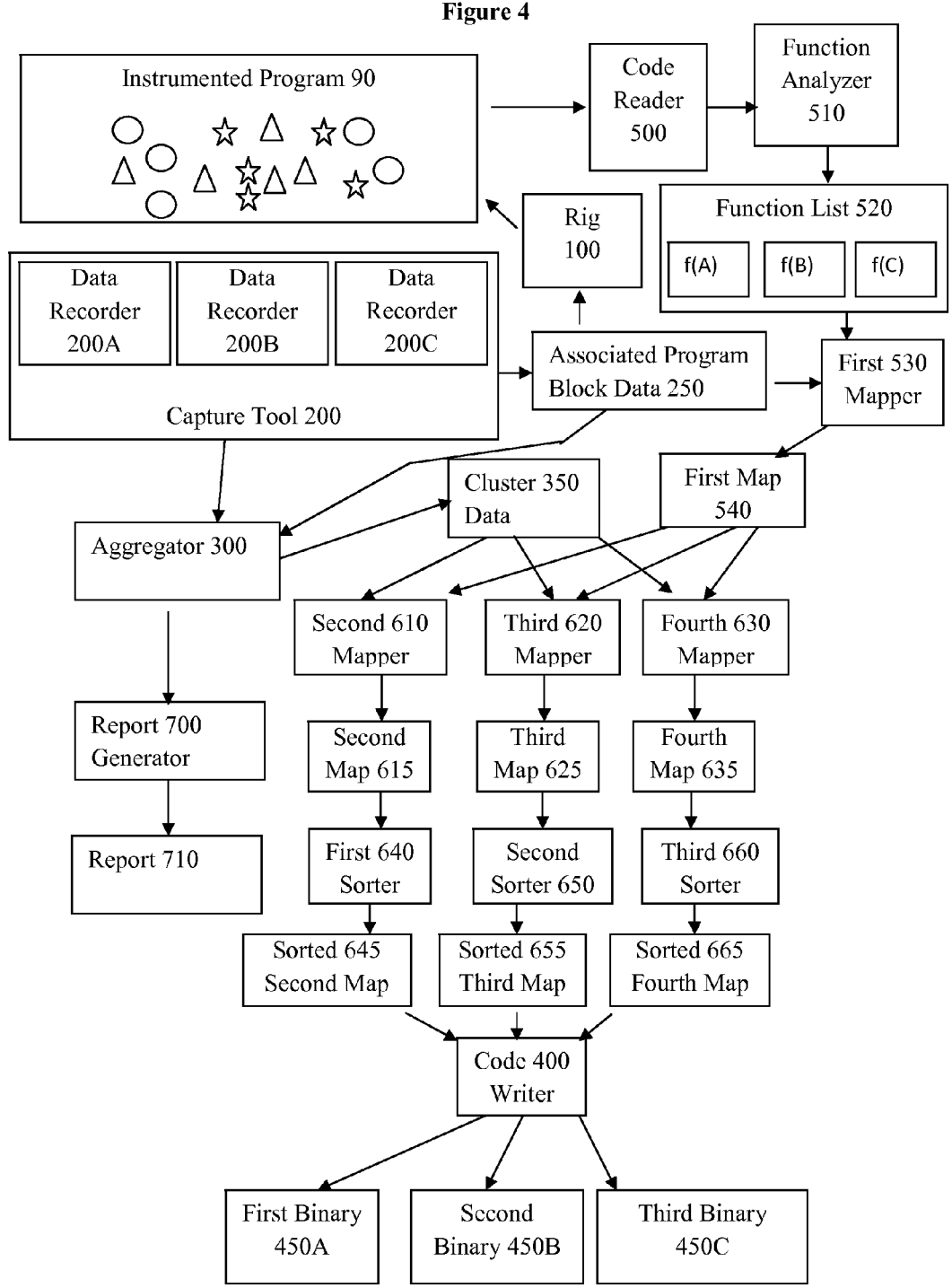
FIG. 4 shows a third process flow diagram of an illustrative configuration.

In FIG. 4, a development tool comprising four mappers is illustrated, each mapper (530, 610, 620, and 630) may be configured to generate an associated map (540, 615, 625, and 635). The first mapper 530 may be configured to access a list of program functions generated by the function analyzer, and access the associated program block data generated by the capture tool. Using the list of program functions and associated code block data, the first mapper 530 may be configured to generate a first map indicating, for example, which code blocks are required for a particular function to be executed. The development tool may also comprise a second mapper 610, a third mapper 620, and a fourth mapper 630. The second, third, and fourth mappers may be configured to access cluster data 350 generated by the aggregator 300 and the first map 540 generated by the first mapper. Using the first map and cluster data, the three mappers may be configured to generate a respective second map 615, third map 625 and fourth map 635, each map mapping different data. For example, the second map 615 may indicate which functions are frequently executed and which code blocks are required for each frequently executed function to be executed. The third map 625 may indicate which functions are most frequently executed together and which code blocks are required for execution of the functions frequently executed together. The fourth map 635 may indicate which functions are most frequently executed within a close time proximately to a particular function.

The development tool may also comprise a plurality of sorters (640, 650, 660), and in some configurations, the development tool may comprise a sorter for each N−1 mappers (e.g. if there are six mappers, there may be five sorters.) Depending on the configuration, not all mappers will require a sorter, and in some configurations multiple sorters (or sorting algorithms) may be used to sort information used to generate the map. As shown in FIG. 4, first sorter 640 may be configured to sort functions in the second map by execution frequency, the second sorter 650 may be configured to sort functions in the third map by frequency of execution together, and the third sorter 660 may be configured to sort functions in the fourth map by time period of execution with respect to a particular function. The output of the sorters may be in the form of an updated map. For example, the first sorter 640 may be configured to create a sorted version of the second map, wherein the functions are sorted by frequency of execution. The second sorter 650 may create a sorted version of the third map, wherein the functions are sorted by the second sorter on the bases of frequency of execution together. The third sorter 660 may be configured to generate a sorted version of the fourth map, wherein the functions are sorted by time period of execution with respect to a particular function.

Once the maps are sorted and updated by the sorters, the code writer 400 may use the sorted maps to generate one more optimized binary executable files. The code writer 400 may use one or more of the updated maps, so that the resulting program has intelligently grouped code blocks. Examples of intelligent groupings would depend on the nature of the mapper and sorter creating the maps, but in the example of FIG. 4, the grouping may feature groups comprising code blocks having a similar frequency of execution (from the second map), groups of code blocks comprising code blocks that are frequently executed together (from the third map), and/or groups of code blocks that are frequently executed within a close time proximity to other code blocks in the group (from the fourth map.) The code writer may be configured to therefore generate (in the example of FIG. 4) code featuring code blocks grouped by frequency of execution, frequency of joint execution, and/or frequency of being executed within a short time period of each other.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code embodied on a tangible medium that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may comprise a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A development tool stored on tangible computer readable storage media and configured to cause a processor of a computer to execute instructions comprising:
   a capture tool configured to:
   record which program blocks of an instrumented program are invoked when a use case is executed; and
   generate trace data based on the invoked program blocks;
   an aggregator configured to:
   analyze the trace data;
   determine a first set of program blocks to cluster into a first binary; and
   determine a second set of program blocks to cluster into a second binary; and a code writer configured to access the first set and second set of program blocks and write code composing the first and second binaries based on the first set and second set of program blocks.

2. The development tool of claim 1, wherein the trace data comprises information indicating how many times the program blocks were invoked.

3. The development tool of claim 1, wherein the first binary, second binary, instrumented program, and development tool are individual, separate executables or dynamic-linked libraries.

4. The development tool of claim 1, wherein:
the first set of program blocks comprise program blocks that were invoked at least once during the execution of the use case; and
the second set of program blocks comprise program blocks that were not invoked during the execution of the use case.

5. The development tool of claim 1, wherein the aggregator is configured to determine three sets of program blocks:
the first set comprising program blocks that are always invoked when the use case is run;
the second set comprising program blocks that are sometimes invoked when the use case is run; and
a third set comprising program blocks that were not invoked when the use case was run.

6. The development tool of claim 5, wherein the code writer is configured to generate the first binary such that the first binary is configured to invoke program blocks from the second binary if program blocks from the second binary are needed for execution of the first binary.

7. The development tool of claim 1, further comprising a report generator configured to generate a status report listing how many times a portion of the program blocks in the instrumented program were invoked and much memory was required to invoke each program block in the portion.

8. The development tool of claim 1, wherein:
the aggregator is configured to:
determine which program blocks from the instrumented program were not invoked for the use case; and
cluster those program blocks into a third set of program blocks; and
the code writer is configured to write a third binary wherein the third binary is composed of program blocks from a third set of program blocks.

9. A computer-implemented development tool for analyzing an instrumented program, the tool stored on tangible computer readable storage media for causing a processor of a computer to execute instructions, the tool comprising:
an automation rig configured to execute the instrumented program, the automation rig configured to provide input data for the instrumented program;
a capture tool comprising a plurality of data recorders configured to monitor execution of one or more code blocks of the instrumented program, the data recorders configured to generate associated code block data;
an aggregator configured to generate cluster data based on code block execution patterns; and
a code writer configured to:
generate two binaries from the instrumented program by using the associated code block data and cluster data;
place startup instructions and frequently executed code blocks in the first binary; and
place termination instructions and less frequently executed code blocks in the second binary;
wherein the first and second binaries are individual, separate executables or dynamic-linked libraries.

10. The development tool of claim 9, wherein the associated code block data comprises information indicating how many times the code blocks were executed.

11. The development tool of claim 9, wherein the aggregator is configured to use the associated code block data generated by the data recorders to determine which code blocks to cluster into the first binary.

12. The development tool of claim 9, wherein the aggregator is configured to:
determine in which group to place each code block by analyzing the associated code block data;
form groups of two or more code blocks if the aggregator determines that the two or more code blocks are executed in a similar frequency; and
store the groups as cluster data.

13. The development tool of claim 9, wherein the aggregator is configured to:
determine in which group to place each code block by analyzing the associated code block data;
form groups of two or more code blocks if the aggregator determines that the two or more code blocks are frequently run together; and
store the groups as cluster data.

14. The development tool of claim 9, wherein the aggregator is configured to:
determine in which group to place each code block by analyzing the associated code block data;
form groups of two or more code blocks if the aggregator determines that the two or more code blocks are executed within a close time proximity of each other; and
store the groups as cluster data.

15. The development tool of claim 9, further comprising a function analyzer configured to
obtain code from the code reader and generate a list of functions the instrumented program is configured to execute.

16. The development tool of claim 9, further comprising a first mapper configured to:
access a list of program functions generated by a function analyzer;
access the associated code block data generated by the capture tool and generate a first map indicating which code blocks are required for a particular function to be executed.

17. The development tool of claim 16, further comprising a second mapper configured to:
access the cluster data generated by the aggregator;
access the first map generated by the first mapper; and
generate a second map indicating which functions are frequently executed and what code blocks are required for each frequently executed function to be executed.

18. The development tool of claim 17, further comprising a first sorter configured to sort functions in the second map by execution frequency, the first sorter configured to create a sorted version of the second map, wherein the functions are sorted by frequency of execution.

19. The development tool of claim 18, wherein the code writer is configured to access the second map to rewrite the code in an optimized organization, wherein the optimized organization comprises groups of code blocks, wherein the groups comprise code blocks have a similar frequency of execution.

20. The development tool of claim 17, further comprising a third mapper configured to:
access the cluster data generated by the aggregator;
access the first map generated by the first mapper; and generate a third map indicating which functions are most frequently executed together and which code blocks are required for execution of the functions frequently executed together.

21. The development tool of claim 20, further comprising a second sorter configured to sort functions in the third map by frequency of execution together, the second sorter creating a sorted version of the third map, wherein the functions are sorted by frequency of execution together.

22. A development tool stored on computer readable media for causing a computer comprising a processor to implement the tool to analyze an instrumented program; the tool comprising:
- a code reader configured to obtain object code from the instrumented program;
- a function analyzer configured to generate a function list from code obtained by the code reader;
- a capture tool comprising a plurality of data recorders for monitoring execution of one or more code blocks of the instrumented program; the data recorders generating associated code block data;
- a first mapper configured to:
  - access the list of program functions generated by the function analyzer;
  - access the associated code block data generated by the capture tool; and
  - generate a first map indicating which code blocks are required for a particular function to be executed;
- an aggregator configured to generate cluster data based on code block execution patterns; and
- a code writer configured to access the first map and the cluster data to generate a first binary and a second binary based on the associated code block data and cluster data.

23. The development tool of claim 22 further comprising a second mapper configured to access the first map and cluster data to form a second map comprising a correlation of code blocks, functions, and function execution frequency.

24. A process of generating a plurality of optimized binaries from an input program and input data; the process being performed by a specially configured computer comprising a processor and tangible computer readable storage media comprising an instruction set comprising:
- generating an instrumented version of the input program;
- recording which program blocks of an instrumented program are invoked when a use case is executed;
- generating trace data based on the invoked program blocks;
- analyzing the trace data;
- determining a first set of program blocks to cluster into a first binary;
- determining a second set of program blocks to cluster into a second binary; and
- writing the first and second binaries using the first set and second set of program blocks.

25. The process of claim 24, wherein the trace data comprises information indicating how many times the program blocks were invoked.

26. The process of claim 24, wherein the first binary, second binary, instrumented program, and development tool are individual, separate executables or dynamic-linked libraries.

27. The process of claim 24, wherein:
- the first set of program blocks comprise program blocks that were invoked at least once during the execution of the use case; and
- the second set of program blocks comprise program blocks that were not invoked during the execution of the use case.

* * * * *